United States Patent
Zhang (10) Patent No.: US 11,302,124 B2
(45) Date of Patent: Apr. 12, 2022

(54) METHOD AND APPARATUS FOR EVALUATING VEHICLE, DEVICE AND COMPUTER READABLE STORAGE MEDIUM

(71) Applicant: BAIDU ONLINE NETWORK TECHNOLOGY (BEIJING) CO., LTD., Beijing (CN)

(72) Inventor: Qiuyu Zhang, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 223 days.

(21) Appl. No.: 16/668,380

(22) Filed: Oct. 30, 2019

(65) Prior Publication Data

US 2020/0134946 A1 Apr. 30, 2020

(30) Foreign Application Priority Data

Oct. 30, 2018 (CN) .......................... 201811280541.9

(51) Int. Cl.
*G07C 5/08* (2006.01)
*B60W 40/08* (2012.01)
(Continued)

(52) U.S. Cl.
CPC ........... *G07C 5/0841* (2013.01); *B60W 40/08* (2013.01); *B60W 50/045* (2013.01);
(Continued)

(58) Field of Classification Search
CPC ..... G07C 5/0841; G07C 5/008; B60W 40/08; B60W 50/045; B60W 50/14;
(Continued)

(56) References Cited

U.S. PATENT DOCUMENTS 10,185,999 B1 * 1/2019 Konrardy ............... G07C 5/008
10,324,463 B1 * 6/2019 Konrardy ............... G01S 19/14
(Continued)

FOREIGN PATENT DOCUMENTS

CN 202243010 U 5/2012
CN 103234763 A 8/2013
(Continued)

OTHER PUBLICATIONS

Office Action for Chinese Application No. 201811280541.9, dated Apr. 20, 2020.
(Continued)

*Primary Examiner* — Richard M Camby
(74) *Attorney, Agent, or Firm* — Fay Sharpe LLP (57) ABSTRACT

Embodiments of the present disclosure provide a method and an apparatus for evaluating a vehicle, a device and a computer readable storage medium. The method includes: determining driving information of the vehicle in an automatic driving mode, the driving information including at least one of trip information, power consumption information and driver state of the vehicle in the automatic driving mode; determining usage situation of the vehicle in the automatic driving mode based on the driving information; and providing the usage situation of the vehicle.

13 Claims, 4 Drawing Sheets

(51) Int. Cl.
*B60W 50/04* (2006.01)
*B60W 50/14* (2020.01)
*G06K 9/00* (2022.01)
*G07C 5/00* (2006.01)

(52) U.S. Cl.
CPC ......... *B60W 50/14* (2013.01); *G06K 9/00845* (2013.01); *G07C 5/008* (2013.01); *B60W 2050/046* (2013.01)

(58) Field of Classification Search
CPC ....... B60W 2050/046; B60W 2556/10; B60W 2050/146; B60W 2540/221; B60W 2556/50; B60W 60/00; B60W 40/09; G06K 9/00845; Y02T 10/84; G01D 21/02; G01M 17/007; G01M 17/08
See application file for complete search history.

(56) References Cited

U.S. PATENT DOCUMENTS

| | | | |
|---|---|---|---|
| 10,599,155 B1* | 3/2020 | Konrardy | B60W 60/0011 |
| 2016/0362118 A1* | 12/2016 | Mollicone | G05D 1/0276 |
| 2018/0118219 A1* | 5/2018 | Hiei | B60W 40/09 |
| 2019/0179308 A1* | 6/2019 | Hattori | G05D 1/0088 |

FOREIGN PATENT DOCUMENTS

| | | |
|---|---|---|
| CN | 105225478 A | 1/2016 |
| CN | 107063713 A | 8/2017 |
| CN | 107543726 A | 1/2018 |
| CN | 108609019 A | 10/2018 |
| DE | 102014209854 A1 | 11/2015 |

OTHER PUBLICATIONS

Office Action for European Application No. 19206215.6, dated Mar. 23, 2020.
Study on the Test and Evaluation Method System of Autonomous Vehicles, 3 pages; Abstract.

* cited by examiner

METHOD AND APPARATUS FOR EVALUATING VEHICLE, DEVICE AND COMPUTER READABLE STORAGE MEDIUM

CROSS REFERENCE TO RELATED APPLICATIONS

This application is based on and claims priority to Chinese patent application Serial No. 201811280541.9, filed on Oct. 30, 2018, the entire contents of which are incorporated herein by reference.

TECHNICAL FIELD

Embodiments of the present disclosure relate to a vehicle technology field, and more particularly, to a method and an apparatus for evaluating a vehicle, a device and a computer readable storage medium.

BACKGROUND

In recent years, with the rapid development of technologies related to automatic driving (also known as driverless driving), more and more vehicles may have automatic driving mode for users to use. Currently, the automatic driving mode of the vehicle may be enabled in response to a user's command for starting the automatic driving mode and disabled in response to a user's command for ending the automatic driving mode. In addition, during the process of automatic driving, the contents recognized and executed by the vehicle's automatic driving system can be visually displayed, such as the increasing proximity of other vehicles, objects and other entities to the vehicle.

SUMMARY

According to embodiments of the present disclosure, a scheme for evaluating a vehicle is provided.

In a first aspect of the present disclosure, a method for evaluating a vehicle is provided. The method includes: determining driving information of the vehicle in an automatic driving mode, the driving information comprising at least one of trip information, power consumption information and driver state of the vehicle in the automatic driving mode; determining a usage situation of the vehicle in the automatic driving mode based on the driving information; and providing the usage situation of the vehicle.

In a second aspect of the present disclosure, an apparatus for evaluating a vehicle is provided. The apparatus includes a processor and a memory. The memory is configured to store instructions executable by the processor. The processor is configured to run a program corresponding to the instructions by reading the instructions stored in the memory, so as to perform the method according to the first aspect of the present disclosure.

In a third aspect of the present disclosure, a device is provided. The device includes one or more processors and a storage device configured to store one or more programs. When the one or more programs are executed by the one or more processors, the one or more processors are caused to implement the method according to the first aspect of the present disclosure.

In a fourth aspect of the present disclosure, a computer readable storage medium is provided. The computer readable storage medium is stored thereon with a computer program. When the program is executed by a processor, the method according to the first aspect of the present disclosure is implemented.

It shall be understood that the content described in the section of summary is not intended to limit key or important features of the embodiments of the present disclosure or to limit the scope of the present disclosure. Other features of the present disclosure will be easily understood by the following description.

BRIEF DESCRIPTION OF THE DRAWINGS

In combination with the attached drawings and referring to the following detailed description, the above and other features, advantages and aspects of each embodiment of the present disclosure will become more obvious. In the drawings, the same or similar reference numeral represents the same or similar element, in which.

DETAILED DESCRIPTION

Embodiments of the present disclosure are described in more detail below with reference to the attached drawings. Although some embodiments of the present disclosure are illustrated in the attached drawings, it should be understood that the present disclosure may be implemented in various forms and should not be interpreted as limited to the embodiments elaborated herein. Rather, providing these embodiments is for a more thorough and complete understanding of the present disclosure. It should be understood that the accompanying drawings and embodiments of the present disclosure are intended for exemplary use only and are not intended to limit the protection scope of the present disclosure In the description of embodiments of the present disclosure, the term "including" and similar terms shall be understood as open inclusion, i.e. "including but not limited to". The term "based on" should be understood to mean "at least partially based on". The term "an embodiment" or "such embodiment" shall be understood as "at least one embodiment". The terms "first", "second", and so on can refer to different or identical objects. Other explicit and implicit definitions may be included below.

There is currently no technology to evaluate vehicles in the automatic driving mode, which leads to the inability to timely and intuitively know the overall situation in the automatic driving mode, which is not advantageous for the management and use of vehicles. In view of this, according to embodiments of the present disclosure, a scheme for evaluating a vehicle in an automatic driving mode is proposed. In this scheme, the usage situation of the vehicle in the automatic driving mode is evaluated based on the driving information of the vehicle in the automatic driving mode, the driving information including at least one of trip information, power consumption information and driver state. Thus, the usage situation of the vehicle can be provided, which is helpful for optimization, management and use of the vehicle. Embodiments of the present disclosure will be described in detail with reference to the attached drawings.

Figure 1:
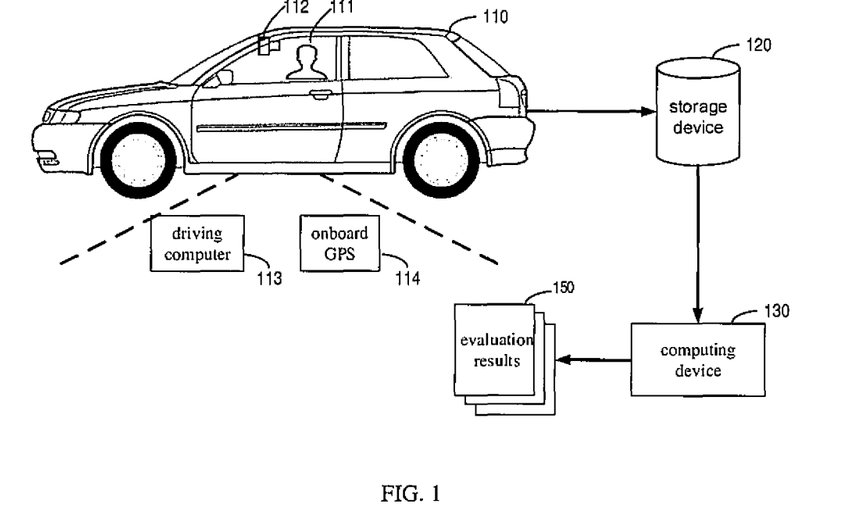
FIG. 1 illustrates an example environment in which embodiments of the present disclosure may be implemented.

FIG. 1 illustrates an example environment in which embodiments of the present disclosure may be implemented. In this example environment 100, a vehicle 110 is schematically illustrated. The vehicle 110 may be any type of vehicle that can carry people/or things and move through power systems such as engines, including but not limited to cars, trucks, buses, electric cars, motorcycles, RVS, trains, etc. According to some embodiments of the preset disclosure, the vehicle 110 may have an automatic driving mode and a normal driving mode. In the automatic driving mode, the vehicle 110 may operate with the help of the intelligent driving system equipped with the vehicle itself, without the participation of the driver 111. Based on the automatic perception of the vehicle on surrounding environment, the intelligent driving system determines the executable driving behavior of the vehicle in the current environment, and then controls the vehicle to realize the corresponding driving behavior. The scheme of embodiments of the present disclosure is suitable for any intelligent driving system, which is not repeated here to avoid confusion. However, in the normal driving mode, the driver 111 is required to control the entire operation of the vehicle 110. In an alternative embodiment, the vehicle 100 may have only the automatic driving mode, and such a vehicle is also known as a driverless vehicle.

In the environment 100, the vehicle 110 may be driven by the driver 111 in the normal driving mode or may be driven in the automatic driving mode. The vehicle 110 may include an in-vehicle camera 112, a driving computer 113 and an onboard GPS 114. It should be understood that although only the in-vehicle camera 112, the driving computer 113, and the onboard GPS 114 are shown here, the vehicle 110 may also be equipped with any other suitable facilities, which not shown here for the sake of illustrating. In addition, it should be understood that, although only one in-vehicle camera 112 is shown, the vehicle 110 may include more in-vehicle cameras, which is not limited in any way in embodiments of the present disclosure.

According to some embodiments of the present disclosure, the in-vehicle camera 112 may at least record operating information of the driver, such as attention area information, facial expression information, non-driving behavior information and so on. In an additional embodiment, the in-vehicle camera 112 may also record information associated with the passenger or other things in the vehicle. It should be understood that the in-vehicle camera 112 may be placed inside the vehicle 110 or outside the vehicle 110, as long as the in-vehicle camera 112 may record the information inside the vehicle 110. Embodiments of the present disclosure is not limited thereto. According to some embodiments of the present disclosure, the driving computer 113 may record information about fuel consumption and speed of the vehicle, for example, immediate fuel consumption (or electricity consumption), average fuel consumption (or electricity consumption), remaining amount of oil (or electricity), cruising range, engine speed, water temperature, and so on. According to some embodiments of the present disclosure, the onboard GPS (global positioning system) 114 may be used to locate the current position of the vehicle 110.

The storage device 120 and the computing device 130 are also shown in the environment 100. According to embodiments of the present disclosure, information obtained from the vehicle may be stored to the storage device 120, for performing evaluation of the vehicle at the computing device 130, thereby outputting the evaluation result 150. The storage device 120 may be any suitable storage device, which is not elaborated here. The computing device 130 may be any server or terminal device with computing capabilities. It should be understood that although the storage device 120 and the computing device 130 are shown here as independent of the vehicle 110, the storage device 120 and the computing device 130 may also be integrated with the vehicle 110 in alternative embodiments.

Figure 2:
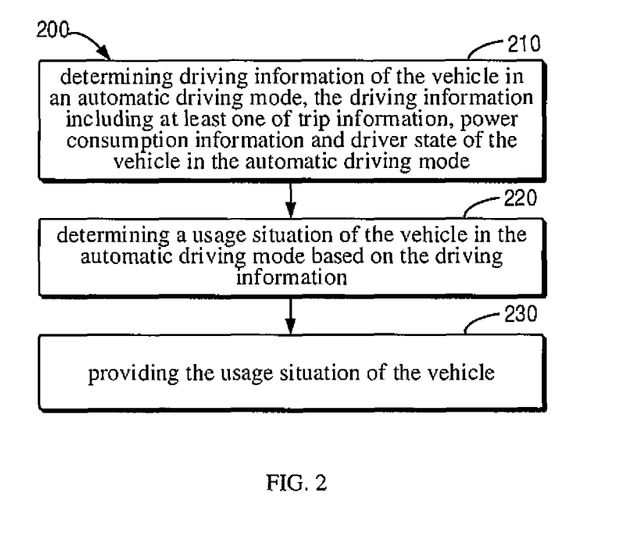
FIG. 2 illustrates a flowchart of a method for evaluating a vehicle according to some embodiments of the present disclosure.

The scheme for evaluating the vehicle according to embodiments of the present disclosure will be described in detail below in combination with FIGS. 2-5. FIG. 2 illustrates a flowchart of a method 200 for evaluating a vehicle according to some embodiments of the present disclosure. The method 200 may be implemented at the computing device 130 in FIG. 1, and thus it is described below in combination with the environment of FIG. 1.

As illustrated in FIG. 2, at block 210, driving information of the vehicle 110 in the automatic driving mode may be determined. According to some embodiments of the present disclosure, the driving information may include at least one of trip information, power consumption information and driver state of the vehicle 110 in the automatic driving mode. In some embodiments, related information of the vehicle 110 in the automatic driving mode may be obtained from data recorded by the in-vehicle 112, the driving computer 113 and the onboard GPS 114, and further, the driving information of the vehicle 110 in the automatic driving mode is determined, including the trip information, the power consumption information, and the driver state. It should be understood that there may be no driver state when the vehicle 110 is the driverless vehicle.

At block 220, usage situation of the vehicle in the automatic driving mode is determined based on the driving information. According to some embodiments of the present disclosure, the usage situation of the vehicle may include at least one of time saving information, power consumption saving information and relax degree of driver of the vehicle in the automatic driving mode. It should be understood that, embodiments of the present disclosure are not limited to this, but are intended to cover any information related to the usage situation of the vehicle in the automatic driving mode. Here, time saving information, power consumption saving information and relax degree of driver are only taken as examples, and specific embodiments are described in combination with FIGS. 3-5.

Figure 3:
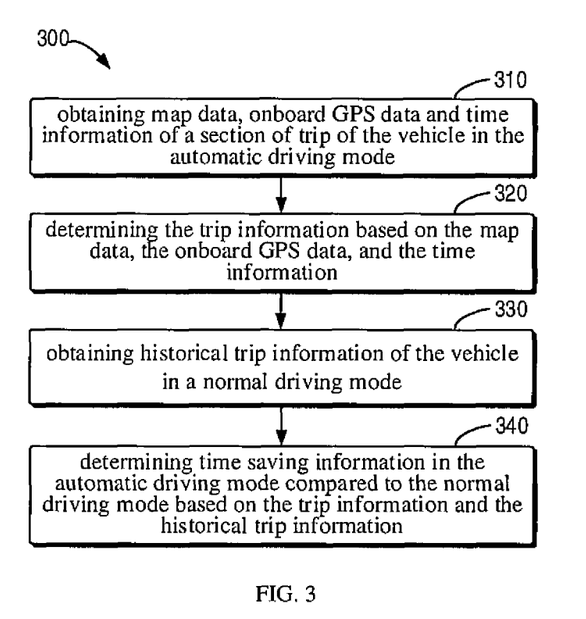
FIG. 3 illustrates a flowchart of a method for evaluating time saving in an automatic driving mode according to some embodiments of the present disclosure.

FIG. 3 illustrates a flowchart of a method 300 for evaluating time saving in an automatic driving mode according to some embodiments of the present disclosure. Similarly, the method 300 may be implemented at the computing device 130 of FIG. 1, and thus it is described below in combination with the environment in FIG. 1.

As illustrated in FIG. 3, at block 310, map data, onboard GPS data and time information of a section of trip of the vehicle 110 in the automatic driving mode are obtained. According to some embodiments of the present disclosure, information related to the whole trip in the automatic driving mode may be obtained. In alternative embodiments, only information related to a part of the trip in the automatic driving mode may be obtained.

According to some embodiments of the present disclosure, the map data may be obtained from the vehicle 110, for example, if the vehicle 110 has an onboard navigator. In an alternative embodiment, the map data may be obtained from outside of the vehicle 110. For example, in some embodiments, map data stored locally in the computing device 130 may be obtained. In an alternative embodiment, the computing device 130 may obtain the map data from a remote server that maintains the map data. According to some embodiments of the present disclosure, the computing device 130 may obtain the onboard GPS data and time information from an onboard GPS 140 of the vehicle 110.

At block 320, the trip information is determined based on the obtained map data, onboard GPS data and time information. In some embodiments, combined with the map data, onboard GPS data and time information, the position and time of the start and end of the automatic driving mode may be determined, and then the trip length and trip time under the automatic driving mode may be determined. In some embodiments, combined with the map data, onboard GPS data and time information, it is possible to determine the condition of the road through which the vehicle 110 passes in the automatic driving mode, such as the lengths of the congested road section and slow-moving road section and the corresponding passing time. It should be understood that the embodiments of the present disclosure are not limited to this and, for the sake of brevity, will not be enumerated here.

At block 330, historical trip information of the vehicle in a normal driving mode is obtained. According to some embodiments of the present disclosure, based on the positions of the start and end of the automatic driving mode, the map data, onboard GPS data and time information of the vehicle 110 passing the same positions of start and end in the normal driving mode in a previous period of time may be obtained, and based on the obtained information, the historical trip information may be determined. For example, in some embodiments, the trip length and trip time in normal driving mode may be determined. In some embodiments, the condition of the road through which the vehicle 110 passes in the normal driving mode may be determined, such as the lengths of the congested road section and slow-moving road section and the corresponding passing time. This historical trip information may be determined by operations similar to those described at blocks 310 and 320. Other details on this point are described at blocks 310 and 320, and will not be repeated here.

At block 340, time saving information in the automatic driving mode compared to the normal driving mode may be determined based on the trip information determined at block 320 and the historical trip information determined at block 330. In some embodiments, the total time saved in the whole trip in the automatic driving mode compared to the normal driving mode may be determined based on the whole trip time in the automatic driving mode and the whole trip time in the normal driving mode. In some embodiments, based on the time of passing through the congested road section in the automatic driving mode and the time of passing through the congested road section in the normal driving mode, the time saved in the congested road section in the automatic driving mode may be determined compared with the normal driving mode. It should be understood that the embodiments of the present disclosure are not limited to this and, for the sake of brevity, will not be enumerated here.

Figure 4:
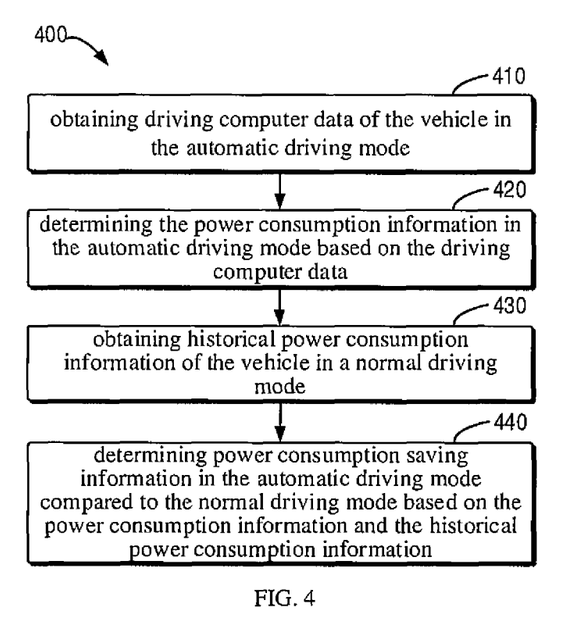
FIG. 4 illustrates a flowchart of a method for evaluating power consumption saving in an automatic driving mode according to some embodiments of the present disclosure.

FIG. 4 illustrates a flowchart of a method 400 for evaluating power consumption saving in an automatic driving mode according to some embodiments of the present disclosure. Similarly, the method 400 may be implemented at the computing device 130 of FIG. 1, and thus it is described below in combination with the environment in FIG. 1.

As illustrated in FIG. 4, at block 140, driving computer data of the vehicle 110 in the automatic driving mode is obtained, for example, from the driving computer 113. According to some embodiments of the present disclosure, information related to the whole trip in the automatic driving mode may be obtained. In alternative embodiments, only information related to a part of the trip in the automatic driving mode may be obtained.

At block 420, power consumption information in the automatic driving mode may be determined based on the driving computer data. In some embodiments, an average power consumption of the whole trip in the automatic driving mode may be determined from the driving computer data. In some embodiments, the fuel (or electricity) consumption for the entire trip in the automatic driving mode may be determined from the driving computer data. It should be understood that embodiments of the present disclosure are not limited to this and, for the sake of brevity, will not be enumerated here.

At block 430, historical power consumption information of the vehicle 110 in the normal driving mode is obtained. According to some embodiments of the present disclosure, based on the positions of the start and end of the automatic driving mode, the driving computer data of the vehicle 110 passing the same positions of start and end in the normal driving mode in a previous period of time may be obtained, and based on the obtained data, the historical power consumption information may be determined. For example, in some embodiments, the average power consumption on the same trip in the normal driving mode may be determined. In some embodiments, the fuel (electricity) consumption on the same trip in the normal driving mode may be determined. This historical power consumption information may be determined by operations similar to those described at blocks 410 and 420. Other details on this point are described at blocks 410 and 420, and will not be repeated here.

At block 440, power consumption saving information in the automatic driving mode compared to the normal driving mode may be determined based on the power consumption information determined at block 420 and the historical power consumption information determined at block 430. In some embodiments, the power consumption saved in the whole trip in the automatic driving mode compared to the normal driving mode may be determined based on the corresponding average power consumption or total fuel (electricity) consumption in the whole trip in the automatic driving mode and in the normal driving mode. In some embodiments, based on the corresponding average power consumption or fuel (electricity) consumption when passing through the congested road section in the automatic driving mode and in the normal driving mode, the power consumption saved in the congested road section in the automatic driving mode may be determined compared with the normal driving mode. It should be understood that the embodiments of the present disclosure are not limited to this and, for the sake of brevity, will not be enumerated here.

Figure 5:
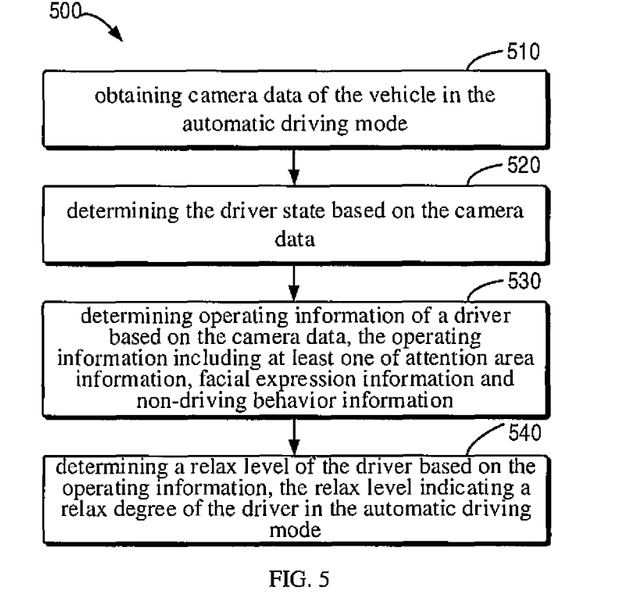
FIG. 5 illustrates a flowchart of a method for evaluating a relax degree of a driver in an automatic driving mode according to some embodiments of the present disclosure.

FIG. 5 illustrates a flowchart of a method 500 for evaluating a relax degree of a driver in an automatic driving mode according to some embodiments of the present disclosure. Similarly, the method 500 may be implemented at the computing device 130 of FIG. 1, and thus it is described below in combination with the environment in FIG. 1.

As illustrated in FIG. 5, at block 510, camera data of the vehicle 110 in the automatic driving mode is obtained, for example, from the in-vehicle camera 112. In some embodiments, based on the time of the start and end of the automatic driving mode, image data captured in this time period may be obtained from the camera data.

At block 520, operating information of the driver is determined based on the camera data. According to some embodiments of the present disclosure, attention area information, facial expression information, non-driving behavior information and the like of the driver 111 may be determined by analyzing the obtained image data.

In some embodiments, the image data may be analyzed by machine vision technology to determine the driver 111's attention to lane area and other areas. The lane area includes the lane in which the driver is driving and the lanes on both sides of the driving. Other areas include the dashboard, rearview mirror, and pedestrians on the side of the road. In some embodiments, for example, the positions of facial feature points of the driver may be extracted by machine vision, the head deflection angle of the driver may be calculated, and the discriminant index of the degree of attention may be established, so that the driver's current degree of attention to the predetermined area may be distinguished. In some embodiments, for example, the driver's attention to the lane area may be determined by determining whether the time in which the driver pays attention to the lane area or other areas exceeds the predetermined threshold. It should be understood that this can be achieved using any suitable machine vision technology known or developed in the future in the field.

In some embodiments, the image data may be analyzed through emotion recognition technology to determine the facial expression information of the driver Ill, such as calmness, tension, fear, happiness, anger, surprise and so on. In some embodiments, for example, the more frequent facial expressions of the driver 111 in the automatic driving mode may be determined as the facial expression information of the driver 111. It should be understood that this can be achieved using any appropriate emotion recognition technology known or developed in the future in the field.

In some embodiments, the image data may be analyzed by machine vision technology to determine the non-driving behavior information of the driver 111, such as talking on the phone, looking down to play with the phone, talking with others on the side, smoking cigarettes and so on. In some embodiments, for example, the duration of the driver's non-driving behavior in the automatic driving mode may be determined as the non-driving behavior information of the driver 111. In some embodiments, for example, the number of types of the driver's non-driving behavior in the automatic driving mode may be determined as the non-driving behavior information of the driver 111. It should be understood that this can be achieved using any suitable machine vision technology known or developed in the future in the field.

At block 530, a relax level of the driver 11I is determined based on the operating information obtained at block 520. The relax level indicates a relax degree of the driver 111 in the automatic driving mode. According to some embodiments of the present disclosure, the relax level may be defined based on one or more of the attention area information, facial expression information, and non-driving behavior information. For example, the relax level may include relaxed, highly relaxed, and completely relaxed. For example, a situation in which the hands are freed but the driver is required to pay attention to the road is identified as relaxed. The situation of freeing your hands and partially freeing your brain without paying attention to the road is defined as highly relaxed. The situation in which the hands are freed and reading, games and other activities can be carried on is determined as completely relaxed. It should be understood that the definition and determination of relax levels is not limited to this example, and any other appropriate division can be used.

In detail, in some embodiments, for example, when the driver 111's attention area during the automatic driving is lane area, the relax level may be determined as relaxed, while when the attention area is other areas, the relax level may be determined as highly relaxed. In some embodiments, when the attention area is determined to be other area, the relax level may be determined as completely relaxed if it is further determined that the driver's facial expression information during the automatic driving is happy and the duration exceeds the predetermined threshold. In some embodiments, when the attention area is determined to be other area, the relax level may be determined as completely relaxed if it is further determined that the duration of the non-driving behavior of the driver during the automatic driving exceeds the threshold or the number of types of the driver's non-driving behavior exceeds the predetermined threshold.

In some embodiments of the present disclosure, it is also possible to score the attention area information, facial expression information and non-driving behavior information and calculate the total score, and compare the total score with the predetermined threshold of each relax level, so as to determine the relax degree of the driver 111. Alternatively, in some embodiments, weights may be set for each item in this information to correct the total score and improve accuracy.

In some embodiments, for example, a low score may be given for high attention to the lane area in the attention area information, while a high score may be given for low attention to the lane area in the attention area information. For example, a low score could be given for calm expressions in the facial expression information, while a high score could be given for happy expressions in the facial expression information. For example, a high score could be given for looking down and playing with the phone in non-driving behavior information. The higher the total score is, the higher the relax level is.

It should be understood that the method for determining the relax degree is not limited to the above example, and any other appropriate method can be used. By quantifying the relax degree of the driver, it is possible to evaluate the vehicle in the automatic driving mode more accurately, which is beneficial to the optimization, management and use of the vehicle.

So far, some embodiments of evaluating the usage situation of the vehicle are described in combination with FIGS. 3 to 5. Returning to FIG. 2, at block 230, the evaluated usage situation of the vehicle may be provided. In some embodiments, the usage situation of the vehicle may be provided at the end of the automatic driving mode.

Figure 6:
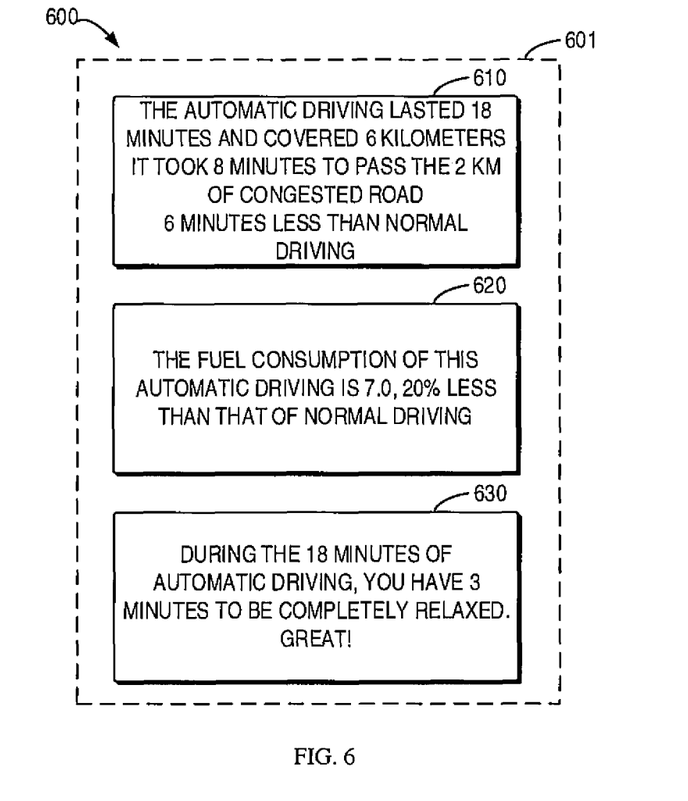
FIG. 6 illustrates a schematic diagram of an example of providing a usage situation of an evaluated vehicle according to some embodiments of the present disclosure.

FIG. 6 illustrates a schematic diagram of an example 600 of providing a usage situation of an evaluated vehicle according to some embodiments of the present disclosure. the example 600 shows the vehicle usage 601, which includes time saving information 610, power consumption saving information 620, and driver state information 630. It should be understood that in an alternative embodiment, the vehicle usage 601 may include only one or two of the time saving information 610, power consumption saving information 620 and driver state information 630. For example, in the case of driverless vehicles, the vehicle usage 601 may only include the time saving information 610 and power consumption saving information 620. In addition, it should be understood that the vehicle usage is not limited to being provided in the manner shown in 610-630 and may be provided in any other manner as appropriate.

According to some embodiments of the present disclosure, the vehicle usage 601 may be presented in a visual form via a display device of the vehicle 110. In some embodiments, it may be presented through the dashboard of the vehicle. In some embodiments, it may be presented through the central control display of the vehicle.

According to alternative embodiments of the present disclosure, the vehicle usage 601 may be presented in an audio form through a speaker system of the vehicle 110. In some other embodiments, the vehicle usage 601 may also be presented on terminals of users. The users may include at least one of the driver, passengers, and managers of the vehicle. The managers may be for example, vendors, manufacturers, and so on. The terminals here may include mobile phones, desktop computers, portable computers, personal digital assistants, and so on. According to some embodiments of the present disclosure, the presenting may be performed in response to a request from the user. In the alternative embodiment, the presenting may be voluntarily provided to the user by the computing device 130.

So far, the method for evaluating the vehicle in the automatic driving mode according to embodiments of the present disclosure is described. By quantifying the usage situation of the vehicle in the automatic driving mode, the vehicle in the automatic driving mode may be evaluated. The evaluation results can be beneficial to the subsequent optimization of vehicle management and use.

Figure 7:
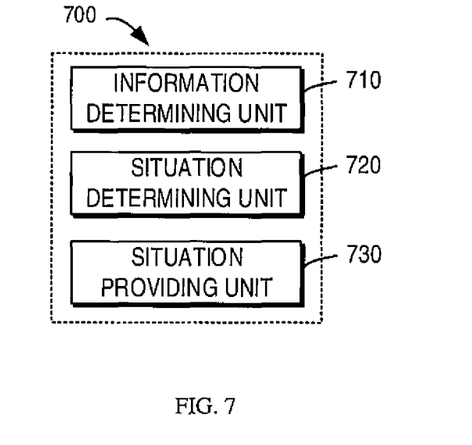
FIG. 7 illustrates a schematic block diagram of an apparatus for evaluating a vehicle according to some embodiments of the present disclosure.

Correspondingly, embodiments of the present disclosure also provide an apparatus for evaluating a vehicle. FIG. 7 illustrates a schematic block diagram of an apparatus 700 for evaluating a vehicle according to some embodiments of the present disclosure. The apparatus 700 may be implemented at the computing device 130 in FIG. 1.

As illustrated in FIG. 7, the apparatus 700 may include an information determining unit 710, a situation determining unit 720 and a situation providing unit 730. The information determining unit 710 may be configured to determine driving information of the vehicle in an automatic driving mode, the driving information including at least one of trip information, power consumption information and driver state of the vehicle in the automatic driving mode. The situation determining unit 720 may be configured to determine a usage situation of the vehicle in the automatic driving mode based on the driving information. The situation providing unit 730 may be configure to providing the usage situation of the vehicle.

According to some embodiments of the present disclosure, the information determining unit may include: an information obtaining unit, configured to obtain map data, onboard GPS data and time information of a section of trip of the vehicle in the automatic driving mode; and a tip determining unit, configured to determine the trip information based on the map data, the onboard GPS data, and the time information.

According to some embodiments of the present disclosure, the situation determining unit 720 may include: a historical trip obtaining unit, configured to obtain historical trip information of the vehicle in the automatic driving mode; and a time saving determining unit, configured to determine time saving information in the automatic driving mode compared to a normal driving mode based on the trip information and the historical trip information.

According to some embodiments of the present disclosure, the information determining unit 710 may include: a driving data obtaining unit, configured to obtain driving computer data of the vehicle in the automatic driving mode; and a power consumption determining unit, configured to determine the power consumption information in the automatic driving mode based on the driving computer data.

According to some embodiments of the present disclosure, the situation determining unit 720 may include: a historical power consumption obtaining unit, configured to obtaining historical power consumption information of the vehicle in a normal driving mode; and a power consumption saving determining unit, configured to determine power consumption saving information in the automatic driving mode compared to the normal driving mode based on the power consumption information and the historical power consumption information.

According to some embodiments of the present disclosure, the information determining unit 710 may include: a camera data obtaining unit, configured to obtain camera data of the vehicle in the automatic driving mode; and a state determining unit, configured to determine the driver state based on the camera data.

According to some embodiments of the present disclosure, the situation determining unit 720 may include: an operating information determining unit, configured to determine operating information of a driver based on the camera data, the operating information including at least one of attention area information, facial expression information and non-driving behavior information; and a relax level determining unit, configured to determine a relax level of the driver based on the operating information, the relax level indicating a relax degree of the driver in the automatic driving mode.

According to some embodiments of the present disclosure, the situation providing unit 730 may include at least one of: a visual presenting unit, configured to present the usage situation of the vehicle in a visual form via a display device of the vehicle; an audio presenting unit, configured to present the usage situation of the vehicle in an audio form via a speaker system of the vehicle; and a terminal presenting unit, configured to present the usage situation of the vehicle on a terminal of a user, the user comprising at least one of a driver, a passenger, and a manager of the vehicle.

Figure 8:
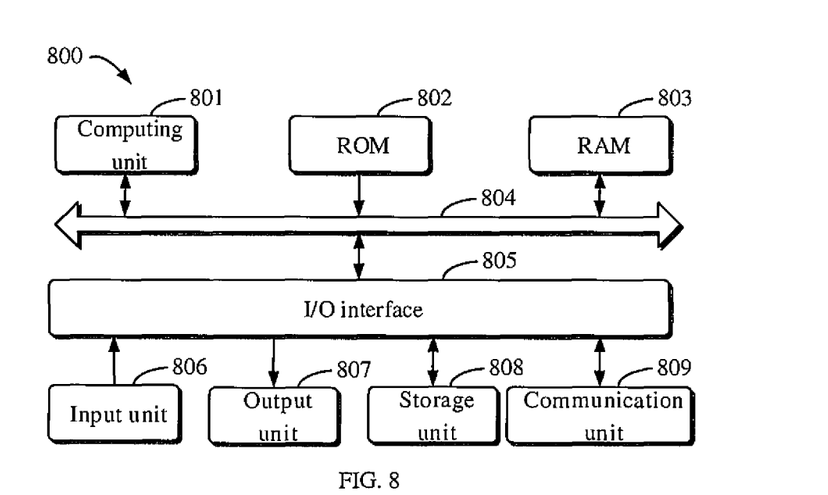
FIG. 8 illustrates a block diagram of a computing device that can implement embodiments of the present disclosure.

FIG. 8 illustrates a block diagram of an exemplary device 800 suitable for implementing embodiments of the present disclosure. The device 800 may be used to implement the computing device 130 in FIG. 1. As illustrated in FIG. 8, the device 800 includes a computing unit (CPU) 801 that can perform various appropriate actions and processes based on computer program instructions stored in the read only memory (ROM) 802 or computer program instructions loaded from the memory unit 808 into the random access memory (RAM) 803. In RAM 803, various programs and data needed for the operation of the device 800 may also be stored. The CPU 801, ROM 802, and RAM 803 are connected to each other via the bus 804. The input/output (I/O) interface 805 is also connected to the bus 804.

Multiple components of the device 800 are connected to the 110 interface 805, including: the input unit 806, such as keyboard, mouse, etc.; the output unit 807, such as various types of monitors, speakers, etc.; storage unit 808, such as disk, CD, etc; and the communication unit 809, such as network cards, modems, wireless transceiver, etc. The communication unit 809 allows the device 800 to exchange information/data with other devices via the computer network such as Internet and/or various telecommunication networks.

The computing unit 801 may be any kind of generic and/or dedicated processing component with processing and computing capability. Examples of the computing unit 801 include but are not limited to the central processing unit (CPU), graphics processing unit (GPU), all kinds of dedicated artificial intelligence (AI) computing chip, all kinds of computing unit running the machine learning model algorithms, digital signal processor (DSP), and any appropriate processor, controller and micro controller, etc. The computing unit 801 performs the various methods and processes described above, such as any of the methods 200, 300, 400 and 500. For example, in some embodiments, any of the methods 200, 300, 400 and 500 may be implemented as a computer software program that is physically contained in machine-readable media, such as storage unit 808. In some embodiments, part or all of a computer program may be loaded and/or installed onto the device 800 via the ROM 802 and/or the communication unit 809. When the computer program is loaded into the RAM 803 and executed by the CPU 801, one or more steps of any of the methods 200, 300, 400 and 500 described above can be executed. Alternatively, in other embodiments, the computing unit 801 may be configured to execute any of the methods 200, 300, 400 and 500 by any other appropriate means (for example, with the help of firmware).

The functions described above herein may be performed at least partially by one or more hardware logic components. For example, demonstration types of hardware logic components that can be used non-restrictively include field programmable gate arrays (FPGA), application specific integrated circuits (ASIC), application specific standard products (ASSP), systems on a chip (SOC), complex programmable logic devices (CPLD), and so on.

Program codes used to implement the method of the present disclosure may be written in any combination of one or more programming languages. The program codes may be provided to a processor or a controller of a general computer, a dedicated computer or other programmable data processing device, such that the program codes, when executed by the processor or the controller, cause the functions/operations defined in the flowchart and/or block diagram to be implemented. The program codes may be executed completely on a machine, partly on the machine, executed partly on the machine as a separate package and partly on a remote machine, or completely executed on a remote machine or a server.

In the context of the present disclosure, machine readable media may be tangible media that may contain or store programs for use by or in conjunction with an instruction execution system, apparatus, or device. The machine readable media may be machine readable signal media or machine readable storage media. The machine readable media may include, but not limited to, electronic, magnetic, optical, electromagnetic, infrared, or semiconductor systems, apparatuses or devices, or any suitable combination of the above. More concrete examples of the machine readable storage medium would include the electrical connection based on one or more lines, portable computer disk, hard disk, random access memory (RAM), read-only memory (ROM), erasable programmable read-only memory (EPROM) or flash memory, optical fiber, convenient type compact disc read-only memory (CD-ROM), optical storage devices, magnetic storage device, or any suitable combination of the above content.

Furthermore, although the operations are depicted in a particular order, this should be understood that the operations are required to be performed in a particular or sequential order as indicated, or that all the operations illustrated should be performed to achieve the desired result. Under certain circumstances, multitasking and parallel processing may be beneficial. Similarly, although some implementation details are included in the above discussion, these should not be interpreted as limiting the scope of the present disclosure. Certain characteristics described in the context of individual embodiments may also be combined and implemented in a single implementation. Conversely, the various characteristics described in the context of a single implementation may also be implemented individually or in any appropriate sub-combination in multiple implementations.

Although the subject has been described in language specific to the structural features and/or logical actions of the method, it should be understood that the subject defined in the attached claim is not necessarily limited to the specific features or actions described above. Instead, the specific features and actions described above are merely an example form of implementing the claims.

What is claimed is:

1. A method for evaluating a vehicle, comprising:
    determining driving information of the vehicle in an automatic driving mode, the driving information comprising a driver state of the vehicle in the automatic driving mode;
    determining a usage situation of the vehicle in the automatic driving mode based on the driving information; and
    providing the usage situation of the vehicle;
    wherein determining the driver state comprises:
    obtaining camera data of the vehicle in the automatic driving mode;
    determining attention area information, facial expression information and non-driving behavior information of the driver based on the camera data;
    scoring the attention area information as a first score, the facial expression information as a second score and the non-driving behavior information as a third score;
    determining a total score of the first score, the second score and the third score as the driver state;
    wherein determining the usage situation of the vehicle comprises: determining a relax level of the driver by comparing the total score with a predetermined threshold of each relax level, the relax level indicating a relax degree of the driver in the automatic driving mode.

2. The method of claim 1, wherein the driving information further comprises trip information, and determining the driving information comprises:
    obtaining map data, onboard GPS data and time information of a section of trip of the vehicle in the automatic driving mode; and
    determining the trip information based on the map data, the onboard GPS data, and the time information.

3. The method of claim 2, wherein determining the usage situation of the vehicle comprises:
    obtaining historical trip information of the vehicle in a normal driving mode; and
    determining time saving information in the automatic driving mode compared to the normal driving mode based on the trip information and the historical trip information.

4. The method of claim 1, wherein the driving information further comprises power consumption information, and determining the driving information comprises:
obtaining driving computer data of the vehicle in the automatic driving mode; and
determining the power consumption information in the automatic driving mode based on the driving computer data.

5. The method of claim 4, wherein determining the usage situation of the vehicle comprises:
obtaining historical power consumption information of the vehicle in a normal driving mode; and
determining power consumption saving information in the automatic driving mode compared to the normal driving mode based on the power consumption information and the historical power consumption information.

6. The method of claim 1, wherein providing the usage situation of the vehicle comprises at least one of:
presenting the usage situation of the vehicle in a visual form via a display device of the vehicle;
presenting the usage situation of the vehicle in an audio form via a speaker system of the vehicle; and
presenting the usage situation of the vehicle on a terminal of a user, the user comprising at least one of a driver, a passenger, and a manager of the vehicle.

7. An apparatus for evaluating a vehicle, comprising:
a processor; and
a memory, configured to store instructions executable by the processor, wherein the processor is configured to run a program corresponding to the instructions by reading the instructions in the memory, so as to perform:
determining driving information of the vehicle in an automatic driving mode, the driving information comprising a driver state of the vehicle in the automatic driving mode;
determining a usage situation of the vehicle in the automatic driving mode based on the driving information; and
providing the usage situation of the vehicle;
wherein determining the driver state comprises:
obtaining camera data of the vehicle in the automatic driving mode;
determining attention area information, facial expression information and non-driving behavior information of the driver based on the camera data;
scoring the attention area information as a first score, the facial expression information as a second score and the non-driving behavior information as a third score;
determining a total score of the first score, the second score and the third score as the driver state;
wherein determining the usage situation of the vehicle comprises: determining a relax level of the driver by comparing the total score with a predetermined threshold of each relax level, the relax level indicating a relax degree of the driver in the automatic driving mode.

8. The apparatus of claim 7, wherein the driving information further comprises trip information, and the processor is configured to:
obtain map data, onboard GPS data and time information of a section of trip of the vehicle in the automatic driving mode; and
determine the trip information based on the map data, the onboard GPS data, and the time information.

9. The apparatus of claim 8, wherein the processor is configured to:
obtain historical trip information of the vehicle in a normal driving mode; and
determine time saving information in the automatic driving mode compared to a normal driving mode based on the trip information and the historical trip information.

10. The apparatus of claim 7, wherein the driving information further comprises power consumption information, and the processor is configured to:
obtain driving computer data of the vehicle in the automatic driving mode; and
determine the power consumption information in the automatic driving mode based on the driving computer data.

11. The apparatus of claim 10, wherein the processor is configured to:
obtain historical power consumption information of the vehicle in a normal driving mode; and
determine power consumption saving information in the automatic driving mode compared to the normal driving mode based on the power consumption information and the historical power consumption information.

12. The apparatus of claim 7, wherein the processor is configured to perform at least one of:
presenting the usage situation of the vehicle in a visual form via a display device of the vehicle;
presenting the usage situation of the vehicle in an audio form via a speaker system of the vehicle; and
presenting the usage situation of the vehicle on a terminal of a user, the user comprising at least one of a driver, a passenger, and a manager of the vehicle.

13. A non-transitory computer readable storage medium, stored thereon with a computer program that, when executed by a processor, a method for evaluating a vehicle is implemented, the method comprising:
determining driving information of the vehicle in an automatic driving mode, the driving information comprising a driver state of the vehicle in the automatic driving mode;
determining a usage situation of the vehicle in the automatic driving mode based on the driving information; and
providing the usage situation of the vehicle;
wherein determining the driver state comprises:
obtaining camera data of the vehicle in the automatic driving mode;
determining attention area information, facial expression information and non-driving behavior information of the driver based on the camera data;
scoring the attention area information as a first score, the facial expression information as a second score and the non-driving behavior information as a third score;
determining a total score of the first score, the second score and the third score as the driver state;
wherein determining the usage situation of the vehicle comprises: determining a relax level of the driver by comparing the total score with a predetermined threshold of each relax level, the relax level indicating a relax degree of the driver in the automatic driving mode.

* * * * *